United States Patent
Tojo et al.

(10) Patent No.: US 6,187,377 B1
(45) Date of Patent: *Feb. 13, 2001

(54) PROCESS FOR FORMING PROTECTIVE FILM ON COATED SURFACE OF AUTOMOBILE

(75) Inventors: Hideaki Tojo; Hisashi Kurota; Kensaku Akasaka; Hideki Obara, all of Saitama-ken (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/147,284

(22) PCT Filed: May 28, 1997

(86) PCT No.: PCT/JP97/01801

§ 371 Date: Nov. 19, 1998

§ 102(e) Date: Nov. 19, 1998

(87) PCT Pub. No.: WO97/45208

PCT Pub. Date: Dec. 4, 1997

(30) Foreign Application Priority Data

May 29, 1996 (JP) .................................................... 8-135092

(51) Int. Cl.⁷ .................................................... B65B 33/00
(52) U.S. Cl. .......................... 427/156; 427/154; 427/286; 427/348; 427/359; 427/378; 427/420; 118/315; 118/323
(58) Field of Search .................................... 427/154, 155, 427/156, 286, 348, 378, 420, 359; 118/304, 323, 315

(56) References Cited

U.S. PATENT DOCUMENTS

| 4,856,543 | * | 8/1989 | Petit .................................... 134/57 R |
| 5,110,632 | * | 5/1992 | Kawaguchi et al. .................. 427/424 |
| 5,454,545 | * | 10/1995 | Taraldsson ............................ 249/115 |
| 5,500,045 | * | 3/1996 | Ehinger et al. ....................... 118/313 |
| 5,686,145 | * | 11/1997 | Akasaka ............................... 427/284 |
| 5,750,190 | * | 5/1998 | Woodhall et al. .................... 427/156 |

FOREIGN PATENT DOCUMENTS

| 61-149274 | 7/1986 | (JP) . |
| 4-94755 | 3/1992 | (JP) . |
| 6-142604 | 5/1994 | (JP) . |
| 6-210236 | 8/1994 | (JP) . |
| WO 96/19296 | 6/1996 | (WO) . |

\* cited by examiner

*Primary Examiner*—Shrive Beck
*Assistant Examiner*—Jennifer Calcagni
(74) *Attorney, Agent, or Firm*—Arent Fox Kintner Plotkin & Kahn, PLLC

(57) ABSTRACT

A strippable paint is poured down onto coated surfaces 1, 2 and 3 of an automobile V within regions to be protected, from a plurality of nozzles 10 disposed in parallel in a widthwise direction of the automobile V above the coated surfaces 1, 2 and 3 of the automobile V, while controlling the number of nozzles which are used to discharge the strippable paint, in accordance with the extent of the regions to be protected. Thereafter, the strippable paint is spread over an entirety of the coated surfaces 1, 2 and 3 in the regions to be protected. Thus, the region covered by each of the nozzles can be relatively reduced to efficiently carry out the pouring-down of the strippable paint and to prevent dusts of a coating material from being scattered to a wide range. In addition, the need for a masking step and/or an inspecting/correcting step can be eliminated to reduce the operating steps and further to alleviate the operational load.

15 Claims, 11 Drawing Sheets

PROCESS FOR FORMING PROTECTIVE FILM ON COATED SURFACE OF AUTOMOBILE

FIELD OF THE INVENTION

The present invention relates to a process for forming a protective film of a strippable paint on a coated surface of an automobile in order to temporarily protect the coated surface, and particularly, to a process for forming a protective film for temporarily protecting a coated surface of a completed automobile in the transportation of the automobile.

BACKGROUND ART

To avoid that an outer surface of a completed automobile suffers a contamination due to soot, dusts, iron powder rust, acid rain and the like, a corrosion due to excrement of birds and insects, or a damage such as a scratch during transportation or storage of the completed automobile, it is conventionally carried out that the coated surf ace of the completed automobile is temporarily protected by a protective film formed from the strippable paint. In a technique disclosed in Japanese Patent Application Laid-open No. 6-142604, for example, a strippable paint is applied onto coated surfaces by a roller, a brush or the like along an outer peripheral edge of a region to be protected, and after or before such application, the strippable paint is sprayed to a region narrower than the region to be protected, so that an overlapped-coated zone is formed in the double-coated regions.

In the above conventional technique, however, dusts of a coating material may be spread to a wider range during spraying operation of the strippable paint, whereby the dusts may be scattered beyond the overlapped-coated zone to adhere to a portion out of the region to be protected. Therefore, a masking step is required, and/or an inspecting/correcting step is required, resulting in an increase in number of steps.

In applying the strippable paint by a roller, a brush or the like, an operation of putting the strippable paint on the roller or the brush must be repeated many times, which is troublesome. In this case, it is considered that a self-contained roller brush is used, but because a coating material supplying hose is connected to the self-contained roller brush, the direction of movement of the self-contained roller brush is limited; the weight is increased, and the operational load is increased.

The present invention has been accomplished with such circumstances in view, and it is an object of the present invention to provide a process for forming a protective film on coated surfaces of an automobile, wherein it is possible to prevent the strippable paint from being adhered to the portion out of the region to be protected, thereby simplifying the operating steps and alleviating the operational load.

DISCLOSURE OF THE INVENTION

To achieve the above object, according to a first aspect and feature of the present invention, there is provided a process for forming a protective film of a strippable paint onto a coated surface of an automobile to temporarily protect the coated surface, comprising a first step of pouring down the strippable paint onto the coated surface within a region to be protected, from a plurality of nozzles disposed above the coated surface of the automobile in parallel to one another in a widthwise direction of the automobile, while controlling the number of nozzles used to discharge the strippable paint, in accordance with an extent of the region to be protected; a second step of spreading the strippable paint over an entirety of the coated surface in the region to be protected; and a third step of drying the strippable paint on the coated surface to form the protective film, wherein the first to third steps are carried out in the mentioned order. According to a second aspect and feature of the present invention, there is provided a process for forming a protective film of a strippable paint onto a coated surface of an automobile to temporarily protect the coated surface, comprising a first step of pouring down the strippable paint onto the coated surface within a region to be protected, from a plurality of nozzles disposed above the coated surface of the automobile, while controlling the amount of the strippable paint discharged from the nozzles in accordance with an extent of the region to be protected; a second step of spreading the strippable paint over an entirety of the coated surface in the region to be protected; and a third step of drying the strippable paint on the coated surface to form the protective film, wherein the first to third steps are carried out in the mentioned order. Further, according to a third aspect and feature of the present invention, there is provided a process for forming a protective film of a strippable paint onto a coated surface of an automobile to temporarily protect the coated surface, comprising a first step of pouring down the strippable paint onto the coated surface within a region to be protected, from a plurality of nozzles disposed above the coated surface of the automobile, while controlling the number of nozzles used to discharge the strippable paint, and the amount of strippable paint discharged from the used nozzles, in accordance with an extent of the region to be protected; a second step of spreading the strippable paint over an entirety of the coated surface in the region to be protected; and a third step of drying the strippable paint on the coated surface to form the protective film, wherein the first to third steps are carried out in the mentioned order.

With such first to third features, the region covered by each of the nozzles can be relatively reduced, whereby the pouring-down of the strippable paint can be efficiently carried out, and it is possible to prevent dusts of the coating material from being scattered to a wide range, thereby eliminating the need for the masking step and/or the inspecting/correcting step and to reduce the operating steps, and further to alleviate the operational load.

According to a fourth aspect and feature of the present invention, at the first step in the first, second or third feature, the strippable paint is poured down onto the coated surface while being run in a zigzag manner, whereby the pouring-down of the strippable paint in an amount appropriately corresponding to the extent of the coated surface of the automobile can be efficiently carried out.

According to a fifth aspect and feature of the present invention, at the first step in the first, second or third feature, the strippable paint is poured down onto the coated surface within a predetermined area established smaller than the region to be protected, whereby an appropriate amount of the strippable paint corresponding to the extent of the coated surface can be efficiently carried out, while reliably preventing overflow and flowing-down out of the region to be protected.

According to a sixth aspect and feature of the present invention, at the second step in any of the first to fifth features, the strippable paint poured down onto the coated surface is spread by a roller, whereby the thickness of the film on the completion of the spreading over can always be stabilized to contribute to an enhancement in quality of the protective film and to facilitate the peeling-off operation.

According to a seventh aspect and feature of the present invention, at the second step in any of the first to fifth features, the strippable paint poured down onto the coated surface is spread by spraying of air from obliquely above the coated surface, whereby the contact of equipment with the strippable paint can be avoided in spreading the strippable paint, thereby facilitating maintenance of an air spraying device, and preventing generation of unevenness in uniformity of the spreading attendant on the contact with the equipment and generation of overflow of the strippable paint from the equipment to further enhance the quality. Further, the thickness of the film on the completion of the spreading can always be stabilized to facilitate the peeling-off operation.

According to an eighth aspect and feature of the present invention, the second step in the fifth feature comprises a first spreading step of spreading the strippable paint remaining in a poured-down state within the predetermined area on the coated surface over the predetermined area by spraying of air from obliquely above the coated surface, and a second spreading step of spreading the strippable paint from the predetermined area to a peripheral edge of the region to be protected after lapse of a predetermined time from completion of the first spreading step. This enables the spreading of the strippable paint onto the coated surface over the predetermined area to be carried out promptly. Thereafter, the strippable paint having the fluidity reduced with lapse of time can be spread to the peripheral edge of the region to be protected of the coated surface, thereby reliably preventing the overflow of the strippable paint and forming the protective film in accurate correspondence to the region to be protected of the coated surface.

According to a ninth aspect and feature of the present invention, in addition to the eighth feature, the strippable paint is spread by a roller in the second spreading step, whereby the spreading of the strippable paint to the peripheral edge of the region to be protected of the coated surface can be reliably carried out.

According to a tenth aspect and feature of the present invention, at the first step in the first, second or third feature, the plurality of nozzles disposed above the automobile in parallel in the widthwise direction of the automobile are lifted or lowered correspondingly to upper and lower positions of the coated surface to be protected of the automobile, and while the automobile and the nozzles are being relatively moved along a longitudinal direction of the automobile, the strippable paint is poured down from the used nozzles which are selected from the plurality of nozzles in accordance with the extent of the coated surface. According to an eleventh aspect and feature of the present invention, at the first step in the fourth feature, the plurality of nozzles disposed above the automobile in parallel in the widthwise direction of the automobile are lifted or lowered from a once-stopped state thereof in a manner corresponding to upper and lower positions of the coated surface to be protected of the automobile, and are moved in longitudinal and widthwise directions of the automobile to pour down the strippable paint in a zigzag manner onto the coated surface to be protected.

With such tenth and eleventh features, an appropriate amount of the strippable paint can be efficiently poured down onto the coated surface of the automobile.

Further, according to a twelfth aspect and feature of the present invention, at the first step in the fourth feature, the plurality of nozzles disposed above the automobile in parallel in the widthwise direction of the automobile that is moved continuously are lifted or lowered correspondingly to the upper and lower positions of the coated surface to be protected of the automobile, and are moved in the widthwise direction of the automobile to pour down the strippable paint in a zigzag manner onto the coated surface to be protected. Thus, the strippable paint can be poured down in the zigzag manner onto the coated surface to be protected, by a further simple construction in which the plurality of nozzles are moved in the widthwise and vertical directions of the automobile.

BRIEF DESCRIPTION OF THE DRAWINGS

FIGS. 1 to 8 show a first embodiment of the present invention, wherein

FIG. 1 is a plan view showing a portion of a protective film forming apparatus;

FIG. 2 is an enlarged sectional view taken along a line 2—2 in FIG. 1;

FIG. 3 is an illustration showing a locus of movement of a nozzle corresponding to an automobile which is in its once-stopped state;

FIG. 4 is an illustration showing a circuit of supplying of a strippable paint to nozzles;

FIG. 5 is a plan view of an automobile after completion of the pouring-down of the strippable paint;

FIG. 6 is a perspective view showing a portion of an air spraying device;

FIG. 7 is a sectional view showing a state of spreading by spraying of air;

FIG. 8 is a plan view of the automobile which is in a spreading course;

BEST MODE FOR CARRYING OUT THE INVENTION

Figure 1:
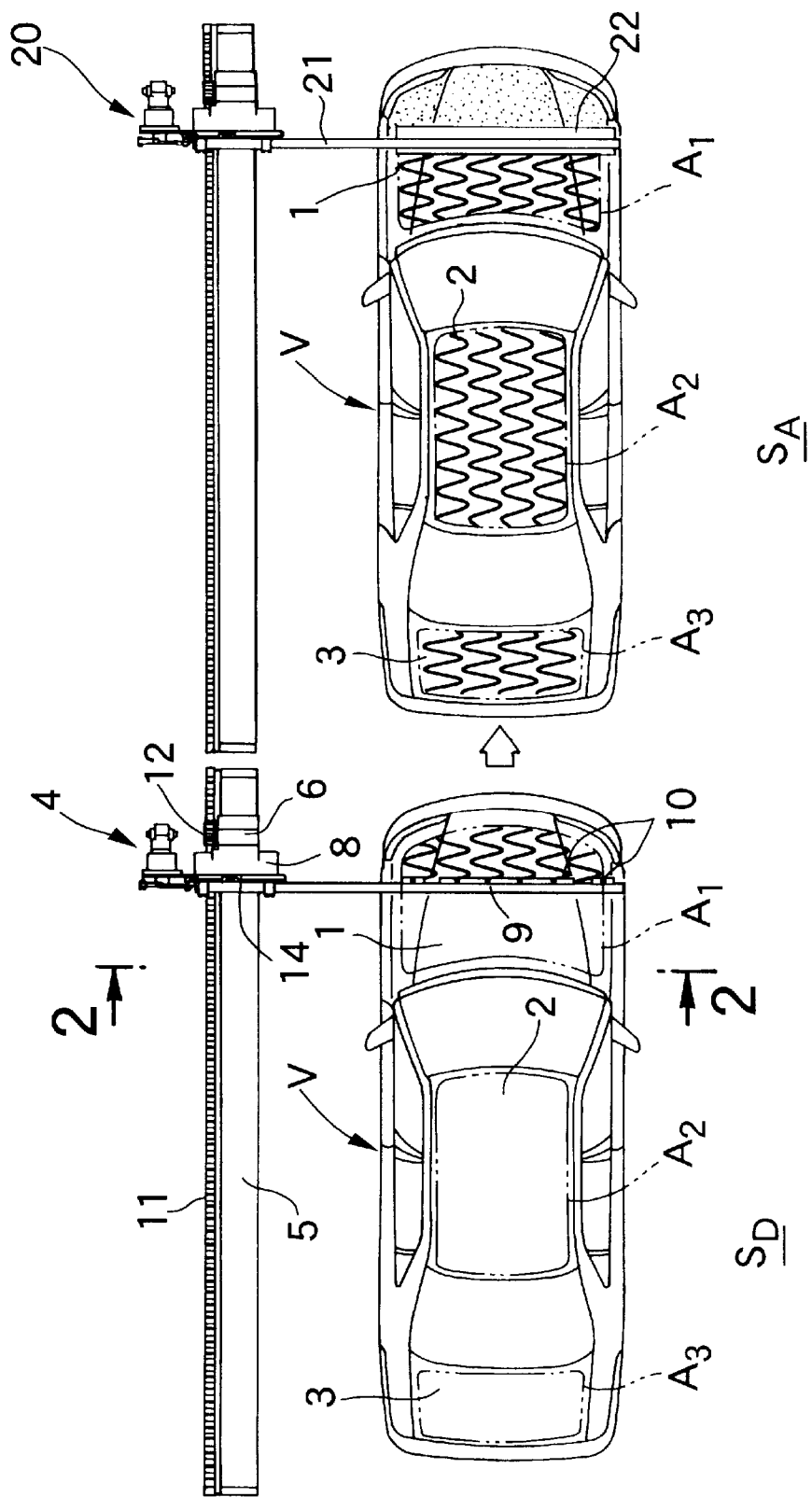

A first embodiment of the present invention will now be described with reference to FIGS. 1 to 8. Referring first to FIG. 1, in forming a protective film for temporarily protecting a coated surface of an automobile V after completion of assembling, the automobile V is transported so as to pass sequentially through a coating material pouring-down station $S_D$, a spreading station $S_A$ and a drying station (not shown).

The protective film is formed on a bonnet coated surface 1, a roof coated surface 2 and a trunk lid coated surface 3 rather than on the entire surface of the automobile V. In the coating material pouring-down station $S_D$, a strippable paint is poured down from above onto the coated surfaces 1, 2 and 3 of a bonnet, a roof and a trunk lid by a coating material pouring-down device 4.

Figure 2:
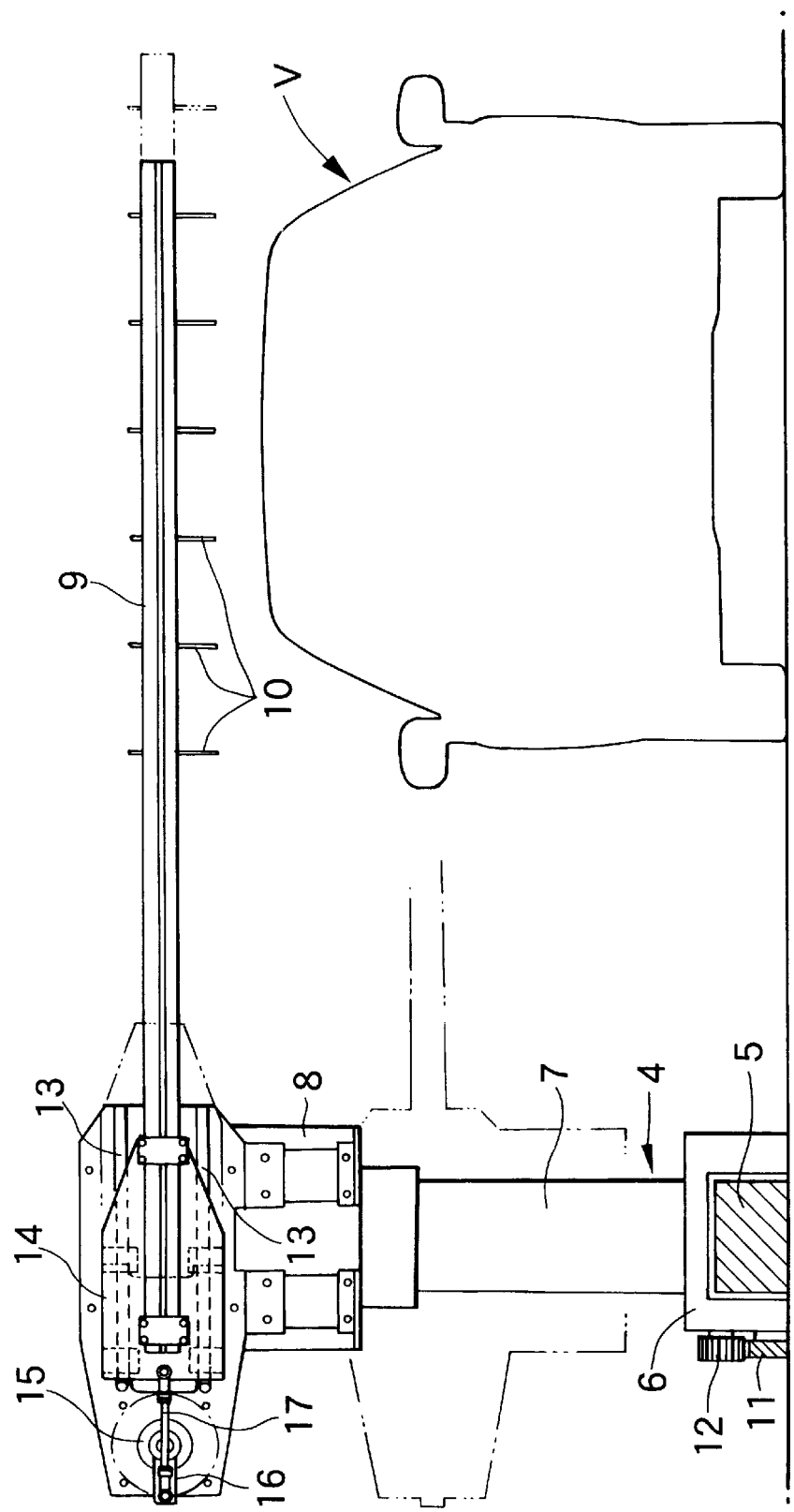

Referring also to FIG. 2, the coating material pouring-down device 4 includes a guide rail 5 which is fixedly disposed on a floor surface sideways of the automobile V in the coating material pouring-down station $S_D$ and which extends in a longitudinal direction of the automobile V, a carriage 6 movable along the guide rail 5, a lifting stand 8 carried for lifting movement on a support pole 7 standing on the carriage 6, a support arm 9 extending in a widthwise direction of the automobile V and carried on the lifting stand 8 for movement in a lengthwise direction of the automobile V, and a plurality of nozzles 10, 10 disposed with their discharge ports turned downwards at a plurality of points spaced apart from one another in a lengthwise direction of the support arm 9.

A rack 11 is fixedly disposed on the floor surface outside the guide rail 5 to extend in parallel to the guide rail 5, and a pinion 12 disposed on the carriage 6 is meshed with the rack 11. A drive source (not shown) such as a motor for rotating the pinion 12 is disposed on the carriage 6, so that the carriage 6 is moved longitudinally of the automobile V by the rotation of the pinion 12. A lifting drive source (not shown) such as a cylinder is provided between the lifting stand 8 and the carriage 6, so that the lifting stand 8 can be lifted and lowered depending upon the level of a top surface of the automobile V.

A pair of upper and lower guide rails 13, 13 are fixed to the lifting stand 8 and extends in a horizontal direction perpendicular to the guide rail 5, and a base end of the support arm 9 is fixed to a moving plate 14 movable along the guide rails 13, 13. An air motor 15 having an axis extending in a lengthwise direction of the guide rail 5 is fixedly disposed on the lifting stand 8, and a crank arm 16 connected to an output shaft of the air motor 15 and the moving plate 14 are connected to each other through a rod 17. Therefore, the support arm 9 and thus the plurality of nozzles 10, 10 are operated in the widthwise direction of the automobile V in response to the rotation of the air motor 15.

Figure 3:
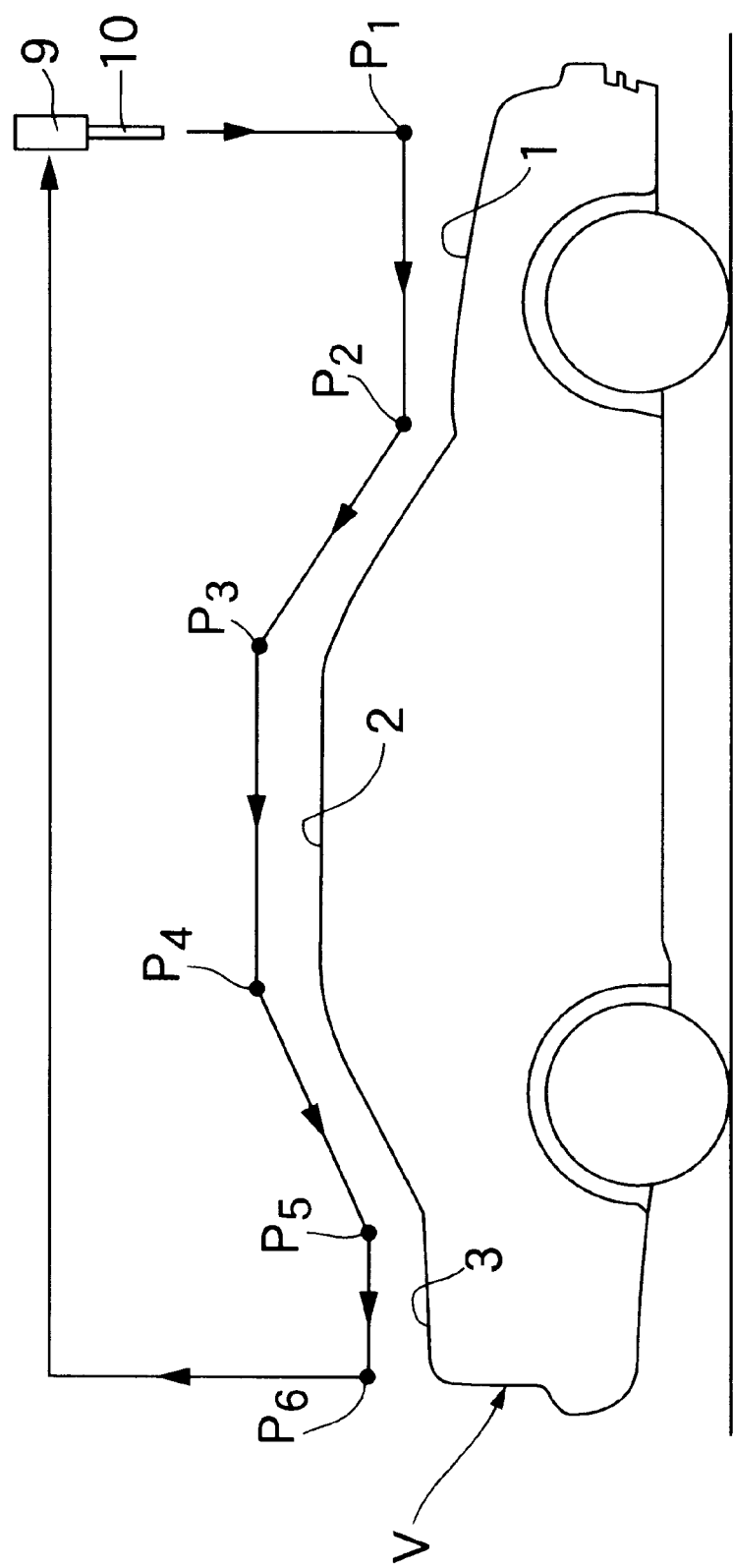

With such coating material pouring-down device 4, the nozzles 10, 10 can be moved as shown in FIG. 3 relative to the automobile V which is in a once-stopped state in the coating material pouring-down station $S_D$, whereby the strippable paint is poured down onto the coated surfaces 1, 2 and 3 of the bonnet, the roof and the trunk lid. More specifically, the nozzles 10, 10 are moved relative to the automobile V which has been moved to a predetermined position in the coating material pouring-down station $S_D$ and once stopped therein, so that they pass sequentially through a first point $P_1$ established at a front portion of the bonnet coated surface 1 of the automobile V, a second point $P_2$ established at a rear portion of the bonnet coated surface 1, a third point $P_3$ established at a front portion of the roof 2, a fourth point $P_4$ established at a rear portion of the roof 2, a fifth point $P_5$ established at a front portion of the trunk lid 3, and a sixth point $P_6$ established at a rear portion of the trunk lid 3. The points $P_1$ to $P_6$ are established at locations which are higher than the coated surfaces 1, 2 and 3 of the bonnet, the roof and the trunk lid by predetermined values.

The strippable paint is supplied to the nozzles 10, 10, but the strippable paint is not usually poured down from all of the nozzles 10, 10, and the number of the nozzles used to pour down the strippable paint and the amount of strippable paint poured down from the nozzles, are controlled depending upon the extent of areas of the coated surfaces 1, 2 and 3 to be protected.

Figure 4:
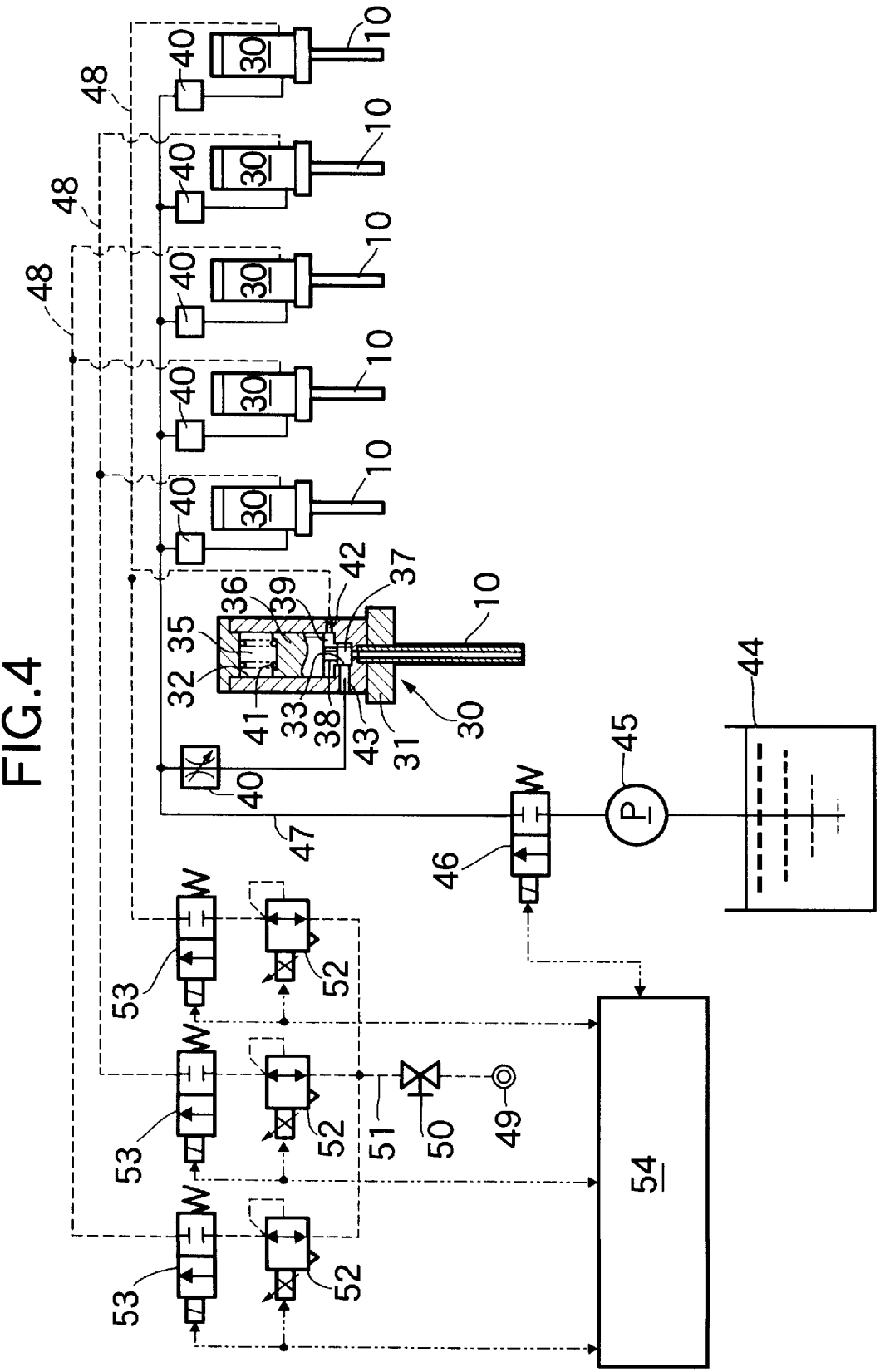

Referring to FIG. 4, the nozzles 10 extending up and down are connected at their upper ends to a plurality of discharge-amount control means 30, 30 which are disposed at a plurality of points spaced apart at the same distance from one another in the lengthwise direction of the support arm 9.

Each of the discharge-amount control means 30 includes a cylindrical housing 31 which is fixed to the support arm 9 and extends vertically with its upper and lower ends closed. An upper first slide bore 32, and a second slide bore 33 are provided in the housing 31 to form an annular step therebetween. The second slide bore 33 has a diameter smaller than that of the first slide bore 32, and is coaxially connected to a lower end of the first slide bore 32.

A first piston 36 is slidably received in the first slide bore 32 to define a spring chamber 35 between the piston 36 and an upper end of the housing 31, and a second piston 37 is slidably received in the second slide bore 33 to define an air pressure chamber 39 between the second piston 37 and the first piston 36. The pistons 36 and 37 are coaxially connected to each other by a connecting shaft 38. The spring chamber 35 opens to the outside, and a spring 41 is provided between the first piston 36 and the housing 31 and accommodated in the spring chamber 35. The housing 31 is also provided with an air pressure supply bore 42 leading to the air pressure chamber 39, and with a paint supply bore 43 which opens into an inner surface of a lower portion of the second slide bore 33 to supply the strippable paint. The nozzle 10 is connected to the lower end of the housing 31 in such a manner that it is coaxially connected to a lower end of the second slide bore 33.

With such discharge-amount control means 30, a force provided by an air pressure in the air pressure chamber 39 is applied to the first and second pistons 36 and 37 to move the pistons 36 and 37 upwards, whereas a spring force of the spring 41 is applied to the pistons 36 and 37 to move the pistons 36 and 37 downwards. The upper and lower positions of the pistons 36 and 37 in the housing 31 are determined at points at which the force provided by the air pressure and the spring force of the spring 41 are balanced with each other. Therefore, when the air pressure applied to the air pressure chamber 39 is smaller, the pistons 36 and 37 are in the lower limit position. In this state, the paint supply bore 43 is fully closed by a side of the second piston 37, whereby the communication between the paint supply bore 43 and the nozzle 10 are cut off and hence, the strippable paint cannot be discharged from the nozzle 10. When the air pressure applied to the air pressure chamber 39 is increased, the pistons 36 and 37 are moved upwards from the lower limit positions, thereby opening the paint supply bore 43. Moreover, the opening degree of the paint supply bore 43 is determined depending on the upper and lower positions of the pistons 36 and 37, i.e., the air pressure applied to the air pressure chamber 39, and the amount of strippable paint discharged from the nozzle 10 is controlled by the air pressure applied to the air pressure chamber 39.

The strippable paint is stored in a tank 44. Examples of the strippable paint which may be properly used, are materials which are excellent in shock and wear resistances after formation of a protective film and have water and oil resistances, and which can easily be peeled off in the form of a single coating film, such as a vinyl chloride-based coating, a vinyl emulsion coating, an aqueous emulsion coating, or a synthetic latex.

A suction port of a pump 45 is connected to the tank 44, and a discharge port of the pump 45 is connected to a paint supply line 47 through a solenoid on-off valve 46. The paint supply line 47 is common to all of the discharge-amount control means 30. The paint supply bores 43 of the discharge-amount control means 30 are connected to the paint supply line 47 through individual flow rate regulating valves 40. The flow rate regulating valves 40 act to regulate the supply amount to supply the strippable paint to the paint supply bores 43 of the discharge-amount control means 30 through the paint supply line 47.

The nozzles 10, 10 are disposed at an even number of points, e.g., six points spaced apart at the same distance from one another in the lengthwise direction of the support arm 9, and the support arm 9 and the nozzles 10, 10 are operated in the widthwise direction of the automobile V. Therefore, for the number of those of the nozzles 10, 10 which pour down the strippable paint and for the amount of strippable paint poured down from the strippable paint pouring-down nozzles, the nozzles 10, 10 lying at symmetrical positions with respect to a center position in a direction of arrangement of the nozzles may be commonly controlled. Therefore, a plurality of, e.g., three air pressure supply lines 48 are disposed one for every pair of the discharge-amount control means 30, 30 lying at the symmetrical position with respect to the center position in the direction of arrangement of the nozzles 10, 10, and are connected to the air pressure supply bores 42. The air pressure supply lines 48 are also connected to a common line 51 leading to an air pressure source 49 and including an on-off valve 50 through pressure control valves 52 and solenoid on-off valves 53, respectively.

The operations of the solenoid on-off valve 46, the pressure control valves 52 and the solenoid on-off valves 53 are controlled by a control unit 54. The control unit 54 has a program previously established therein for controlling the operations of the pressure control valves 52 in accordance with the type of the automobile V advancing into the coating material pouring-down station $S_D$.

Figure 5:
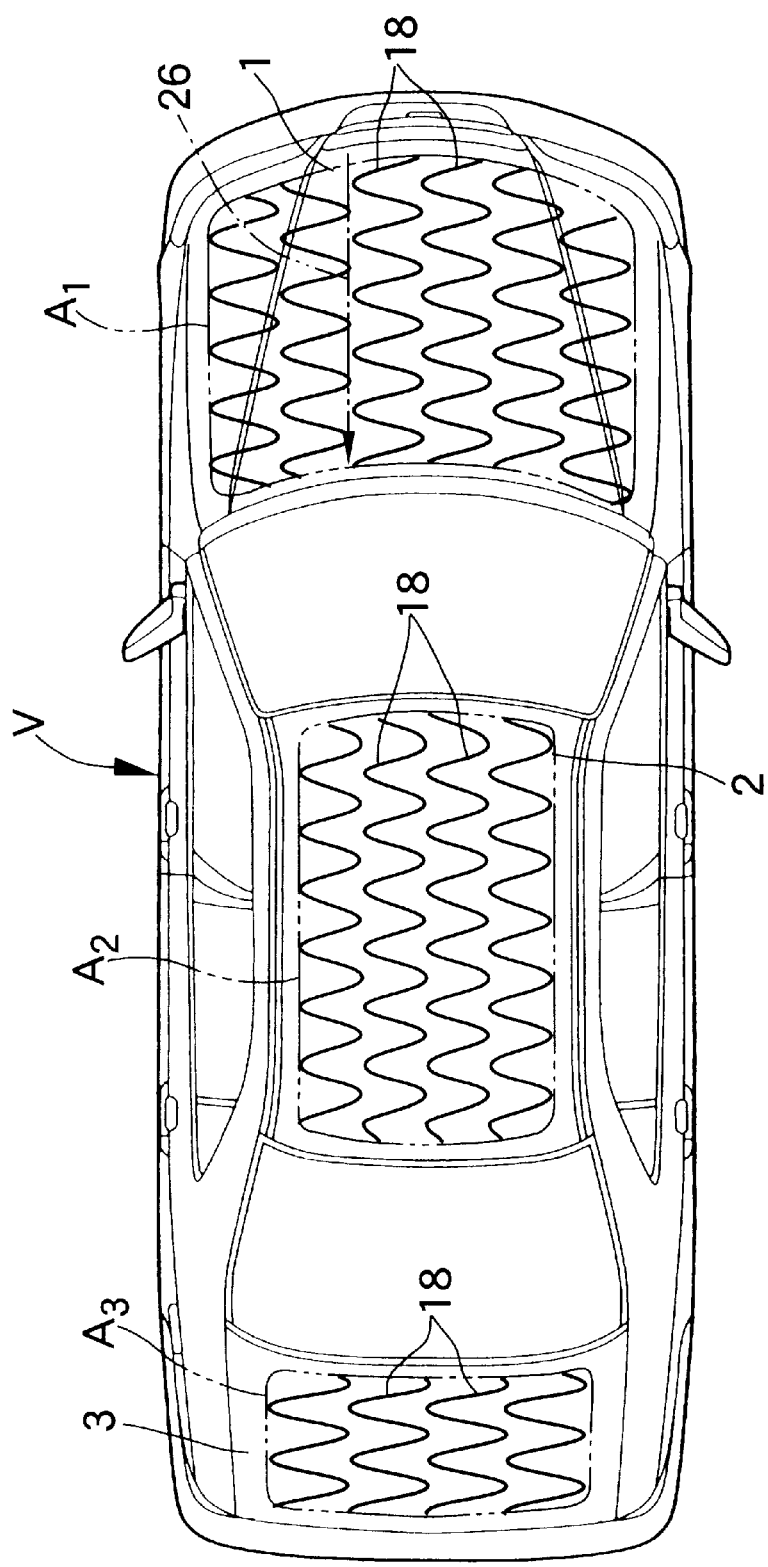

With such coating material pouring-down device 4, zigzag lines of strippable paint 18 poured down are drawn on the coated surfaces 1, 2 and 3 of the bonnet, the roof and the trunk lid of the automobile V stopped in the coating material pouring-down station $S_D$, as shown in FIG. 5. Moreover, the number of the zigzag lines is varied by controlling the number of the nozzles pouring down the strippable paint 18 in accordance with the extents of the coated surfaces. For example, six zigzag lines are drawn on the bonnet coated surface 1, and four zigzag lines are drawn on each of the roof coated surface 2 and the trunk lid coated surface 3.

The areas of the coated surfaces 1, 2 and 3 onto which the coating material is poured down in the coating material pouring-down station $S_D$, are defined as predetermined areas $A_1$, $A_2$ and $A_3$ smaller than profiles of those areas of the coated surfaces 1, 2 and 3 which are to be protected. The strippable paint 18 is poured down only within the predetermined areas $A_1$, $A_2$ and $A_3$.

The automobile V after being subjected to the pouring-down of the coating material in the coating material pouring-down station $S_D$, is transported to the spreading station $S_A$, where the strippable paint 18 on the coated surfaces is spread to the entire areas to be protected by an air spraying device 20 in the spreading station $S_A$.

The air spraying device 20 includes a support arm 21 extending in the widthwise direction of the automobile V, and the lifting and lowering movements of the support arm 21, the movement of support arm 21 in a direction along the longitudinal direction of the automobile V, and the movement of the support arm 21 in a direction along the widthwise direction of the automobile V, are made possible by a construction similar to that of the above-described coating material pouring-down device 4.

Figure 6:
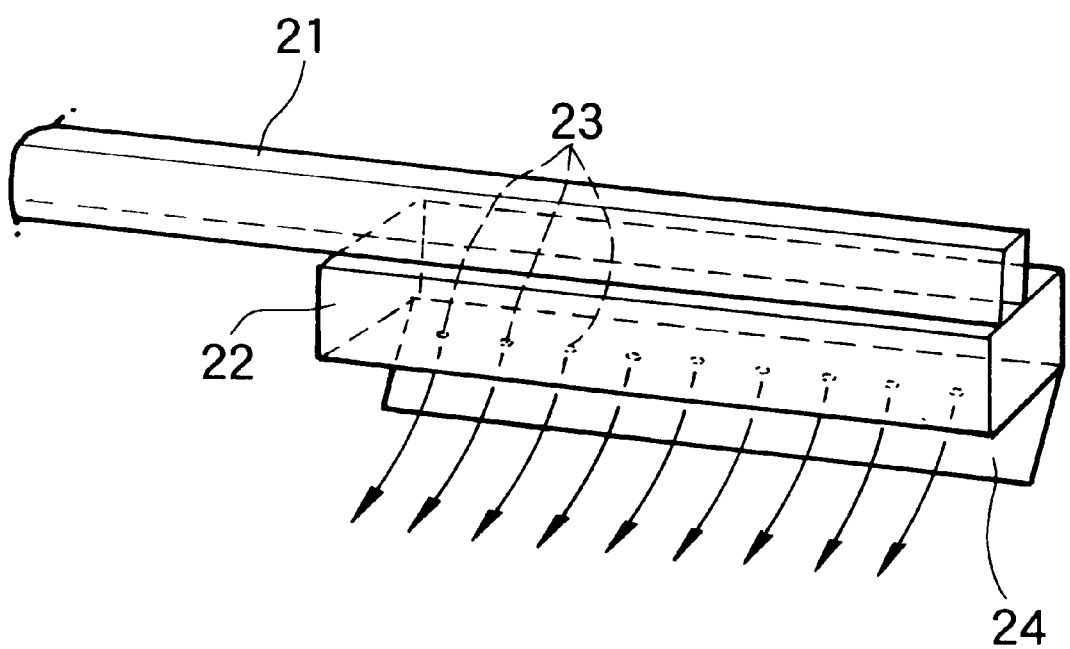
Figure 7:
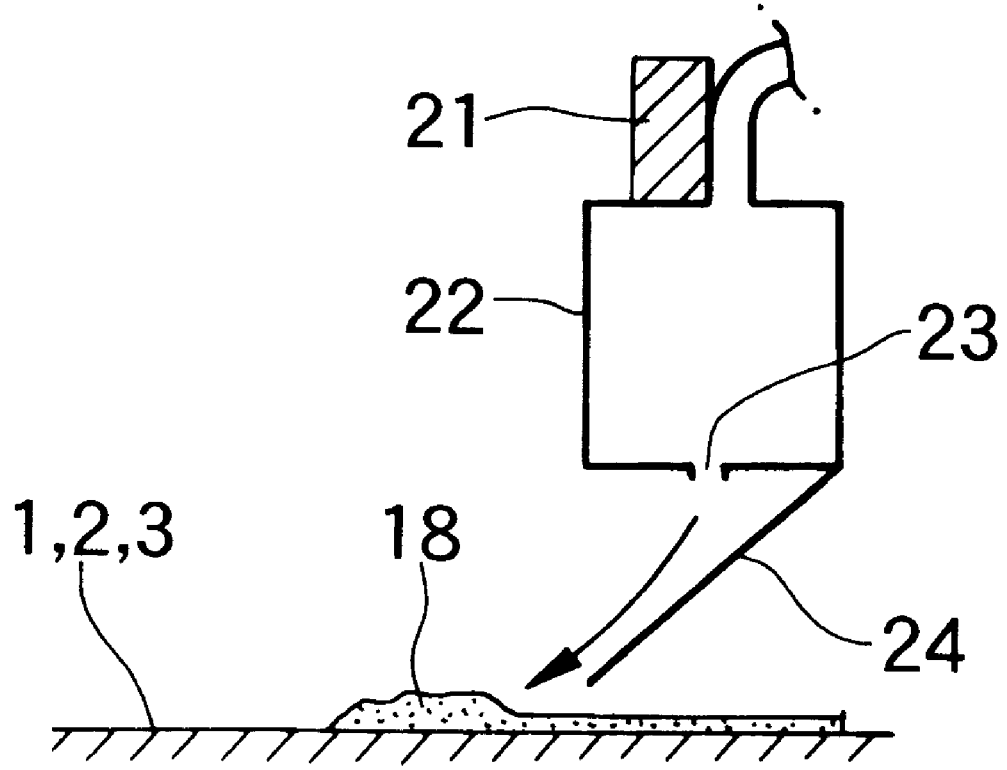

Referring to FIGS. 6 and 7, a hollow box 22 is fixed to the support arm 21 and extends long in the widthwise direction of the automobile V, and pressurized air is supplied from a pressurized air source (not shown) into the box 22. Moreover, a plurality of air ejection bores 23, 23 are provided in a bottom of the box 22 at distances spaced apart from one another in the widthwise direction of the automobile V, and a guide plate 24 is secured to the bottom of the box 22 for guiding air ejected from the air ejection bores 23, 23 to spray the air onto the automobile V from obliquely above the automobile.

Figure 8:
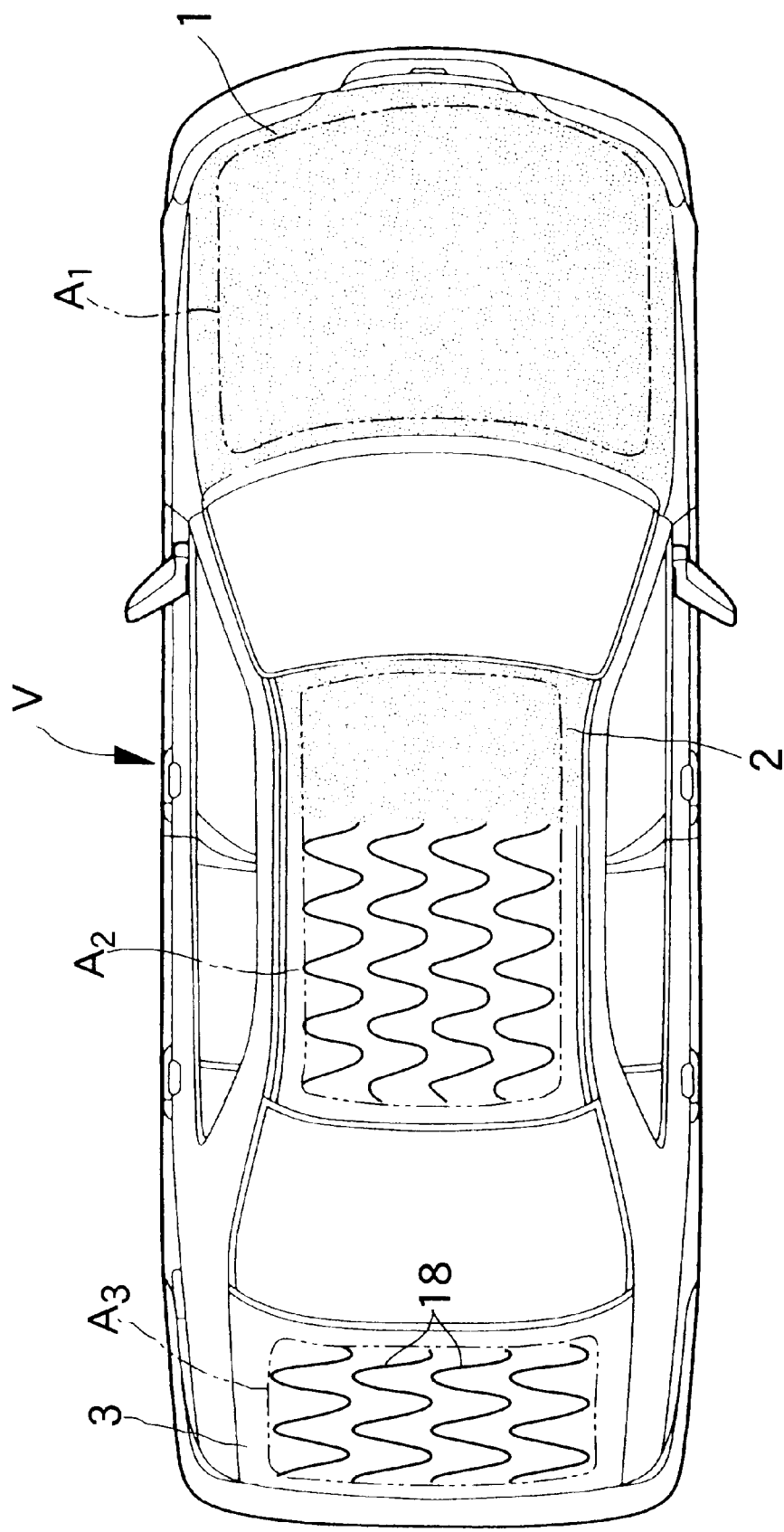

With such air spraying device 20, the strippable paint 18 poured down as the zigzag lines onto each of the coated surfaces 1, 2 and 3, as shown in FIG. 7, is spread sequentially over the entirety of the to-be-protected area of each of the coated surfaces 1, 2 and 3, as shown in FIG. 8, by spraying of air from obliquely above the coated surface.

During this time, the air spraying device 20 spreads the strippable paint from the front site toward the rear site of the automobile V, as shown by an arrow 26 in FIG. 5. In pouring down the coating material in the coating material pouring-down station $S_D$, the operation of the support arm 9 in the coating material pouring-down device. 4 in the coating material pouring-down station $S_D$ is controlled, so that the reversed positions of the adjacent zigzag lines drawn by the strippable paint 18 are substantially aligned with each other in a spreading direction shown by the arrow 26. This achieves the equalization of the thickness of a film produced by the spreading provided by the air spraying device 20.

The automobile V after completion of the spreading in the spreading station $S_A$ is transported to the drying station (not shown), where the strippable paint 18 spread on the coated surfaces 1, 2 and 3 is dried by a drying treatment in the drying station to form a protective film.

The operation of the first embodiment will be described below. To form the protective film on each of the coated surfaces 1, 2 and 3 of the completed automobile V, the automobile V is subjected sequentially to the following steps: a first step of pouring down the strippable paint 18 onto the predetermined areas $A_1$, $A_2$ and $A_3$ smaller than the to-be-protected areas in the coated surfaces 1, 2 and 3; a second step of spreading the strippable paint 18 over the entirety of the coated surfaces 1, 2 and 3 in the to-be-protected areas; and a third step of drying the strippable paint 18 on the coated surfaces 1, 2 and 3 to form the protective film. Therefore, dusts of the coating material cannot be scattered to a wide region and hence, a masking step and an inspecting/correcting step are not required. As a result, the operating process is reduced, and the operational load is remarkably alleviated, as compared with the prior art using a self-contained roller brush.

At the first step, the strippable paint 18 is poured down in a zigzag manner, from the plurality of nozzles 10, 10 disposed above the coated surfaces 1, 2 and 3, while controlling the number of the nozzles used to discharge the strippable paint and the amount of strippable paint 18 discharged from the used nozzles. Therefore, the area covered by each of the nozzles is reduced to the utmost to enhance the operating efficiency and moreover, the pouring-down of an appropriate amount of the strippable paint 18 is carried out efficiently. Additionally, the strippable paint 18 is poured down in accordance with the predetermined areas $A_1$, $A_2$ and $A_3$ smaller than the areas to be protected and therefore, an amount of the strippable paint 18 depending on the extent of each of the coated surfaces 1, 2 and 3 can be poured down with a good efficiency.

Further, the strippable paint 18 poured down depending on the extents of the predetermined areas $A_1$, $A_2$ and $A_3$ is spread by spraying of air. Therefore, the thickness of the film at the completion of the spreading can be always stabilized, which can contribute to an enhancement in quality of the formed protective film, and in carrying out the protective film peeling-off operation, the protective film can be peeled off uniformly and easily.

Moreover, by use of the spraying of air for spreading the strippable paint 18, the contact of the equipment with the strippable paint 18 can be avoided, and maintenance of the air spraying device 20 is facilitated. Thus, it is possible to reliably prevent generation of unevenness of the spreading attendant on the contact of the equipment, and generation of overflow of the strippable paint 18 from the equipment to further contribute to an enhancement in quality.

Figure 9:
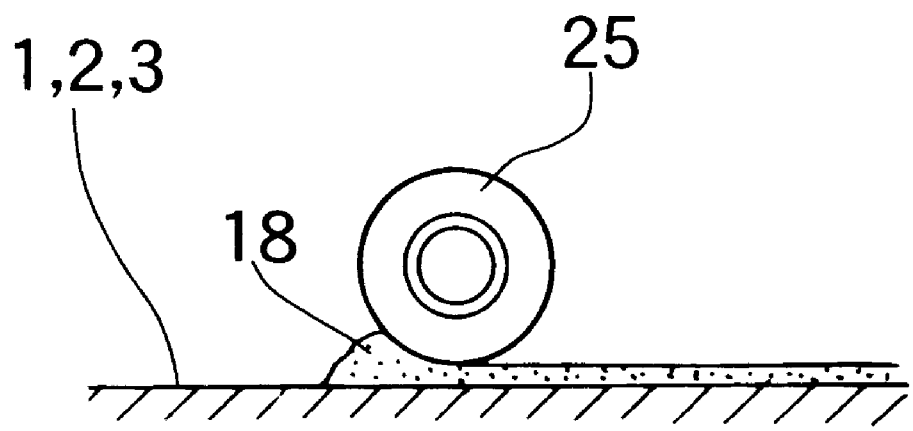
FIG. 9 is a sectional view showing a state of spreading by a roller in a second embodiment.

FIG. 9 shows a second embodiment of the present invention. At a second step after completion of a first step of pouring down the strippable paint 18 onto the predetermined areas $A_1$, $A_2$ and $A_3$ of the coated surfaces 1, 2 and 3, the strippable paint 18 may be spread using a roller 25 over the entirety of each of the coated surfaces 1, 2 and 3 in the region to be protected.

In this case, the roller 25 is used, but the direction of the movement of the roller 25 cannot be limited, as compared with the case where the self-contained roller brush is used. In addition, the roller 25 itself is light in weight and hence, there is not a possibility that the operational load may be increased due to the weight. Moreover, as in the first embodiment, the thickness of the film on the completion of the spreading can always be stabilized to contribute to an enhancement in quality of the protective film and to facilitate the peeling-off operation.

Figure 10:
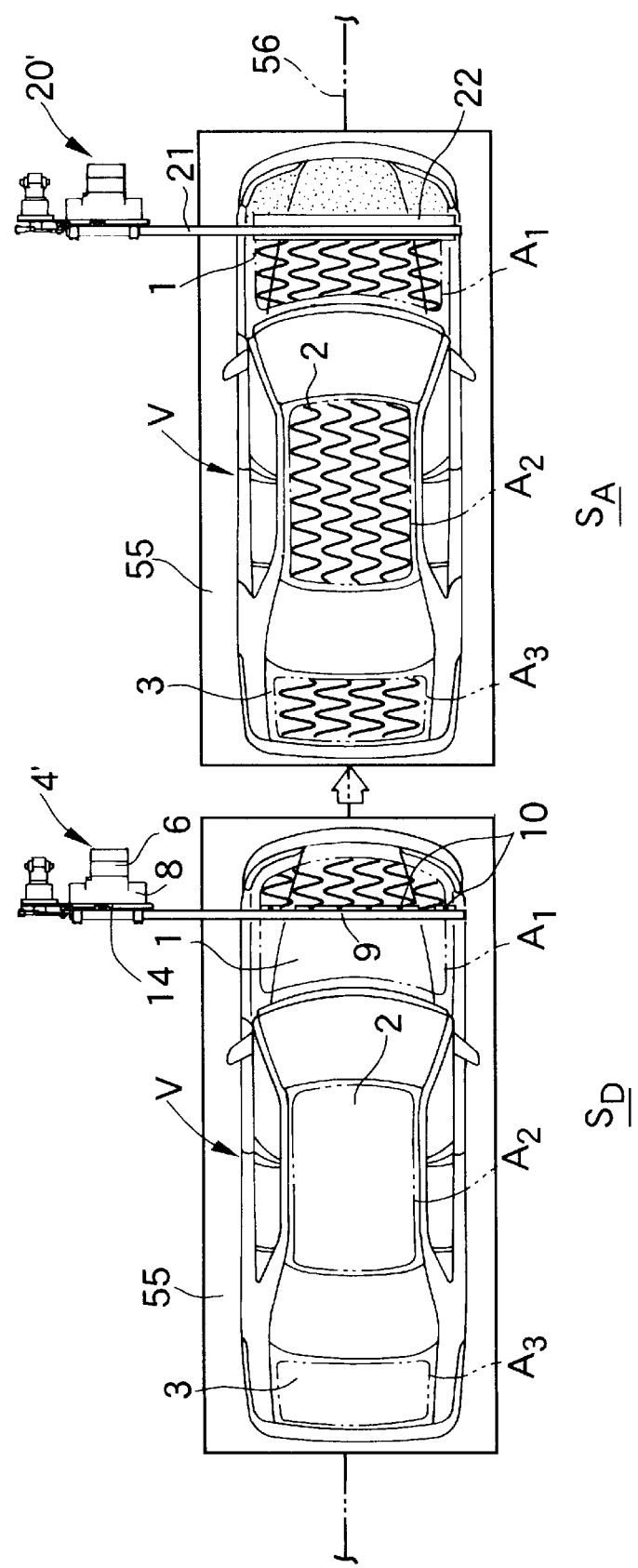
FIG. 10 is a plan view similar to FIG. 1, but according to a third embodiment.

FIG. 10 shows a third embodiment of the present invention. An automobile V is transported by a transporting means 56 comprising a plurality of carriages 55, 55 connected to one another to pass sequentially through the coating material pouring-down station $S_D$, the spreading station $S_A$ and the drying station (not shown).

More specifically, each of the automobiles V is placed onto the carriage 55, and a coating material pouring-down device 4' whose nozzles 10, 10 can be moved in the widthwise and upward and downward directions of the automobile V, is disposed at a fixed position in the coating material pouring-down station $S_D$, and an air spraying device 20' whose box 22 can be moved up and down is disposed at a fixed position in the spreading station $S_A$.

Even with the third embodiment, an effect similar to that in each of the above-described embodiments can be provided by the relative movement of the automobile V and the coating material pouring-down device 4' as well as the air spraying device 20'. Moreover, the coating material pouring-down device 4' may be constructed so that the nozzles 10, 10 are moved in the widthwise and vertical directions of the automobile V and hence, the construction of the coating material pouring-down device 4' becomes more simple. The air spraying device 20' may be also constructed so that the box 22 is moved up and down and hence, the construction of the air spraying device 20' is simplified.

Figure 11:
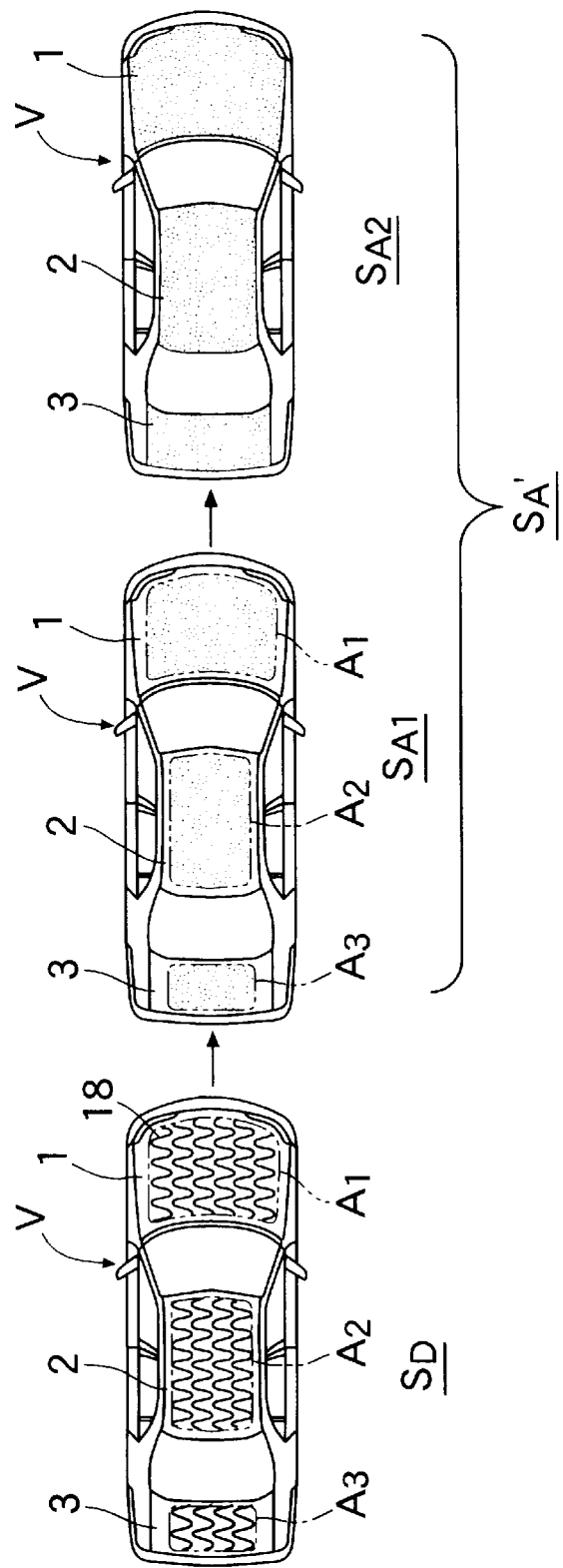
FIG. 11 is a plan view showing sequentially a course of forming a protective film in a fourth embodiment.

FIG. 11 shows a fourth embodiment of the present invention. To form a protective film for temporarily protecting coated surfaces of the automobile V after completion of assembling thereof, the automobile V is transported to pass sequentially through the following stations: a coating material pouring down station $S_D$ in which a first step of pouring down the strippable paint 18 in predetermined areas $A_1$, $A_2$ and $A_3$ established on the coated surfaces 1, 2 and 3 is carried out, a spreading station $S_A'$ in which a second step of spreading the strippable paint 18 over the entirety of the to-be-protected regions in the coated surfaces 1, 2 and 3 is carried out, and a drying station (not shown). The spreading station $S_A'$ includes a first station section $S_{A1}$ for carrying out a first spreading step of spreading the strippable paint 18 in a state poured down onto the coated surfaces 1, 2 and 3 in the predetermined areas $A_1$, $A_2$ and $A_3$, and a second station section $S_{A2}$ for carrying out a second spreading step of spreading the strippable paint 18 until it reaches peripheral edges of the to-be-protected regions from the predetermined areas $A_1$, $A_2$ and $A_3$, after lapse of a predetermined time from the completion of the first spreading step portion.

In the first station section $S_{A1}$ in the spreading station $S_A'$, the strippable paint 18 is spread within the predetermined areas $A_1$, $A_2$ and $A_3$ by spraying air from obliquely above onto the coated surfaces 1, 2 and 3. In the second station section $S_{A2}$, the strippable paint 18 is spread by the roller 25 shown in FIG. 9.

With the fourth embodiment, by carrying out, in the spreading station $S_A'$, the first spreading step portion of spreading the strippable paint 18 in the predetermined areas $A_1$, $A_2$ and $A_3$, and the second spreading step portion of spreading the strippable paint 18 until it reaches the peripheral edges of the to-be-protected regions from the predetermined areas $A_1$, $A_2$ and $A_3$ after the lapse of the predetermined time from the completion of the first spreading step portion, it is possible to form the protective film in accurate correspondence to the to-be-protected regions in the coated surfaces 1, 2 and 3 in such a manner that the overflow and flowing-down of the strippable paint 18 from the to-be-protected regions in the coated surfaces 1, 2 and 3 can be reliably prevented, and the strippable paint 18 having a fluidity reduced due to the lapse of time is spread to the peripheral edges of the to-be-protected regions in the coated surfaces 1, 2 and 3.

Moreover, the spreading of the strippable paint 18 within the predetermined areas $A_1$, $A_2$ and $A_3$ can be carried out promptly by carrying out the first spreading step portion by the spraying of air from obliquely above the areas. In addition, the spreading of the strippable paint 18 to the peripheral edges of the to-be-protected regions of the coated surfaces 1, 2 and 3 can be carried out reliably by carrying out the second spreading step portion using the roller 25.

Although the embodiments of the present invention have been described in detail, it will be understood that the present invention is not limited to the above-described embodiments, and various modifications in design may be made within the spirit and scope of the present invention defined in claims.

What is claimed is:

1. A process for forming a protective film of a strippable paint onto a coated surface of an automobile to temporarily protect the coated surface, comprising a first step of pouring down said strippable paint onto said coated surface within a region to be protected, from a plurality of nozzles disposed above said coated surface of the automobile in parallel to one another in a widthwise direction of the automobile, while controlling the number of nozzles used to discharge the strippable paint, in accordance with an extent of the region to be protected; a second step of spreading said strippable paint over an entirety of said coated surface in the region to be protected; and a third step of drying said strippable paint on the coated surface to form the protective film, wherein said first to third steps are carried out in the mentioned order.

2. A process for forming a protective film on a coated surface of an automobile according to claim 1, wherein at said first step, said strippable paint is poured down onto said coated surface while being run in a zigzag manner.

3. A process for forming a protective film on a coated surface of an automobile according to clam 1, wherein at said first step, said strippable paint is poured down onto said coated surface within a predetermined area established smaller than the region to be protected.

4. A process for forming a protective film on a coated surface of an automobile according to claim 1, wherein at said second step, said strippable paint poured down onto said coated surface is spread by a roller.

5. A process for forming a protective film on a coated surface of an automobile according to claim 1, wherein at said second step said strippable paint poured down onto said coated surface is spread by spraying of air from obliquely above said coated surface.

6. A process for forming a protective film on a coated surface of an automobile according to claim 3, wherein said second step comprises a first spreading step of spreading said strippable paint remaining in a poured-down state within said predetermined area on the coated surface over the predetermined area by spraying of air from obliquely above said coated surface, and a second spreading step of spreading said strippable paint from said predetermined area to a peripheral edge of the region to be protected after lapse of a predetermined time from completion of said first spreading step.

7. A process for forming a protective film on a coated surface of an automobile according to claim 6, wherein at said second spreading step, said strippable paint is spread by a roller.

8. A process for forming a protective film on a coated surface of an automobile according to claim 1, wherein at said first step, the plurality of nozzles are disposed above the automobile and in parallel in the widthwise direction of the automobile are lifted or lowered correspondingly to upper and lower positions of the coated surface to be protected of the automobile, and while the automobile and the nozzles are being relatively moved along a longitudinal direction of the automobile, the strippable paint is poured down from the used nozzles which are selected from the plurality of nozzles in accordance with the extent of said coated surface.

9. A process for forming a protective film on a coated surface of an automobile according to claim 2, wherein at said first step, the plurality of nozzles disposed above the automobile in parallel in the widthwise direction of the automobile are lifted or lowered from a once-stopped state thereof in a manner corresponding to upper and lower positions of the coated surface to be protected of the automobile, and are moved in longitudinal and widthwise directions of the automobile to pour down said strippable paint in a zigzag manner onto said coated surface to be protected.

10. A process for forming a protective film on a coated surface of an automobile according to claim 2, wherein at said first step, the plurality of nozzles disposed above the automobile in parallel in a widthwise direction of the automobile that is moved continuously are lifted or lowered correspondingly to upper and lower positions of the coated surface to be protected of the automobile, and are moved in the widthwise direction of the automobile to pour down the strippable paint in a zigzag manner onto the coated surface to be protected.

11. A process for forming a protective film on a coated surface of an automobile according to claim 1, wherein said process is performed by a pouring-down device for pouring down the strippable paint, said pouring-down device having a support arm which extends above and in a widthwise direction of the automobile, said support arm being reciprocally movable in said widthwise direction and said plurality of nozzles being fixed on said support arm at distances therebetween in the widthwise direction, and wherein said pouring down of said strippable paint onto said coated surface in said first step is conducted by moving said support arm reciprocally in the widthwise direction of the automobile to pour down said strippable paint onto said coated surface in a zigzag manner.

12. A process for forming a protective film of a strippable paint onto a coated surface of an automobile to temporarily protect the coated surface, comprising a first step of pouring down said strippable paint onto said coated surface within a region to be protected, from a plurality of nozzles disposed above the coated surface of the automobile, while controlling the amount of said strippable paint discharged from said nozzles in accordance with an extent of the region to be protected; a second step of spreading said strippable paint over an entirety of said coated surface in the region to be protected; and a third step of drying the strippable paint on the coated surface to form the protective film, wherein said first to third steps are carried out in the mentioned order.

13. A process for forming a protective film on a coated surface of an automobile according to claim 12, wherein said process is performed by a pouring-down device for pouring down the strippable paint, said pouring-down device having a support arm which extends above and in a widthwise direction of the automobile, said support arm being reciprocally movable in said widthwise direction and said plurality of nozzles being fixed on said support arm at distances therebetween in the widthwise direction, and wherein said pouring down of said strippable paint onto said coated surface in said first step is conducted by moving said support arm reciprocally in the widthwise direction of the automobile to pour down said strippable paint onto said coated surface in a zigzag manner.

14. A process for forming a protective film of a strippable paint onto a coated surface of an automobile to temporarily protect the coated surface, comprising a first step of pouring down said strippable paint onto said coated surface within a region to be protected, from a plurality of nozzles disposed above the coated surfaces of the automobile, while controlling the number of nozzles used to discharge said strippable paint, and the amount of strippable paint discharged from said used nozzles, in accordance with an extent of the region to be protected; a second step of spreading said strippable paint over an entirety of said coated surface in the region to be protected; and a third step of drying said strippable paint on said coated surface to form the protective film, wherein said first to third steps are carried out in the mentioned order.

15. A process for forming a protective film on a coated surface of an automobile according to claim 14, wherein said process is performed by a pouring-down device for pouring down the strippable paint, said pouring-down device having a support arm which extends above and in a widthwise direction of the automobile, said support arm being reciprocally movable in said widthwise direction and said plurality of nozzles being fixed on said support arm at distances therebetween in the widthwise direction, and wherein said pouring down of said strippable paint onto said coated surface in said first step is conducted by moving said support arm reciprocally in the widthwise direction of the automobile to pour down said strippable paint onto said coated surface in a zigzag manner.

* * * * *